United States Patent [19]

Langvik

[11] 4,077,887

[45] Mar. 7, 1978

[54] FILTER DISC FOR VACUUM FILTER SYSTEM

[76] Inventor: Sigmund Coll Langvik, P.O. Box 84, 1312 Slependen, Norway

[21] Appl. No.: 797,886

[22] Filed: May 17, 1977

[51] Int. Cl.² ............................................. B01D 25/04
[52] U.S. Cl. .................................... 210/331; 210/347; 210/486
[58] Field of Search ........................ 210/331, 347, 486

[56] References Cited

U.S. PATENT DOCUMENTS

| 1,746,409 | 2/1930 | Sweetland et al. | 210/486 X |
| 2,964,194 | 12/1960 | Oliver, Jr. et al. | 210/486 |

Primary Examiner—Frank A. Spear, Jr.
Attorney, Agent, or Firm—Henry C. Fuller

[57] ABSTRACT

Disclosed herein is a filter sector for a vacuum disc slurry filter which is molded from an elastomer such as rubber and which is provided with a grid of reinforcing bands and a grid of ribs superimposed on the supporting bands to provide a supporting surface for the filter bag. The bands and ribs form slots and channels with a minimum surface area contacting the filter bag to provide increased vacuum communication with the filter bag and thus enhance cake build-up for more efficient separation of the liquids and solids. The use of rubber results in a lighter disc sector and minimizes abrasion on the filter bag and increases bag life.

4 Claims, 7 Drawing Figures

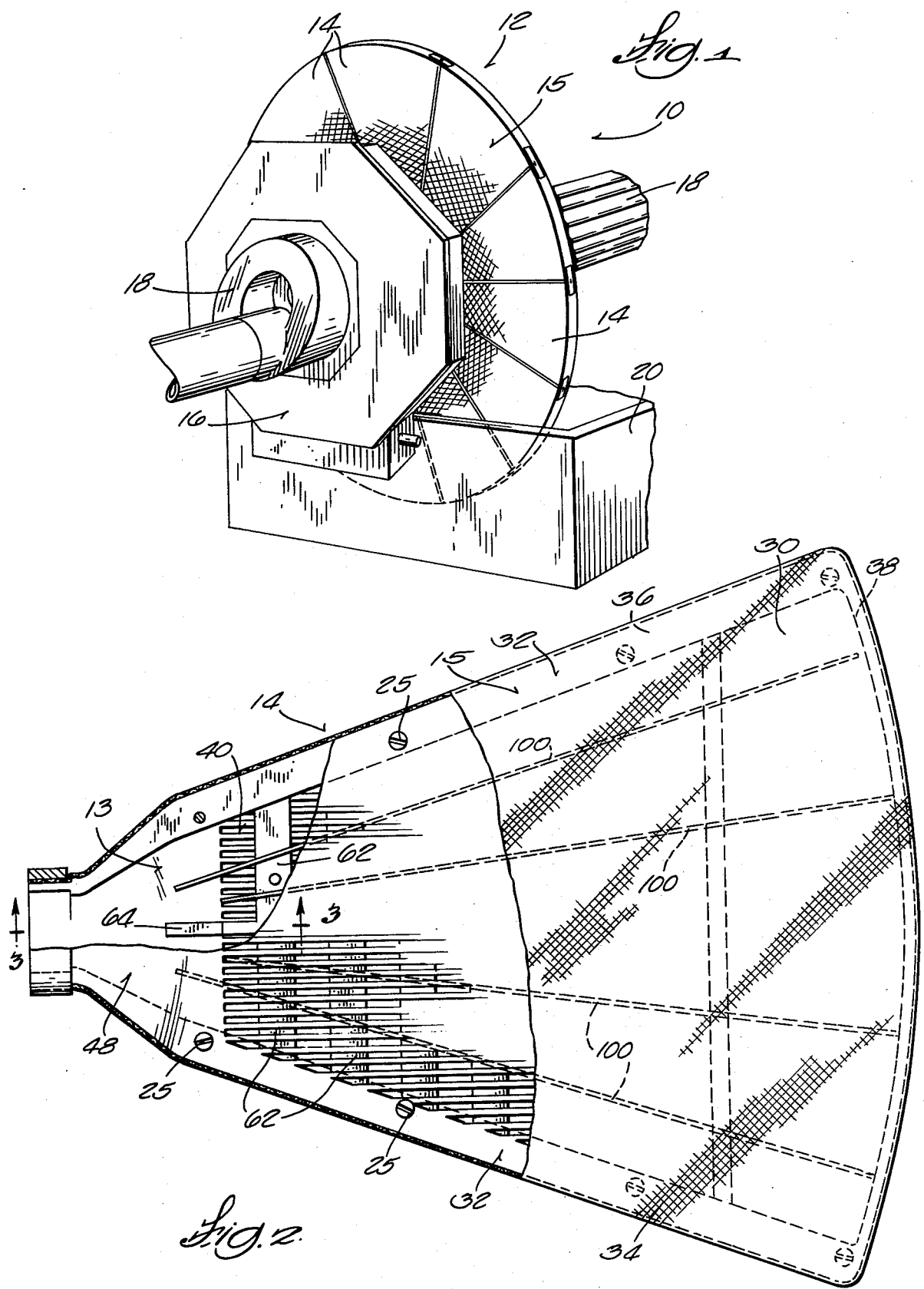

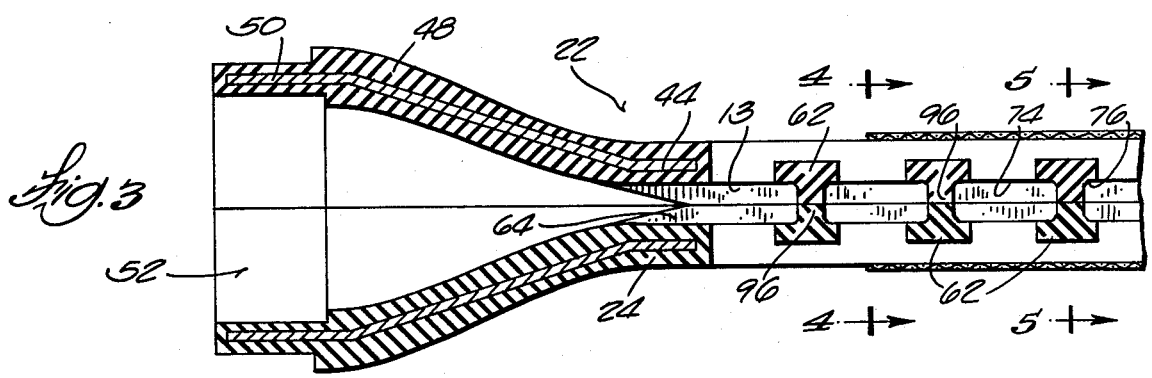
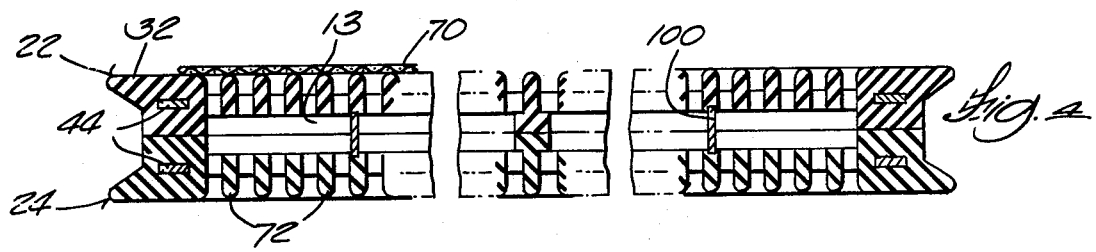
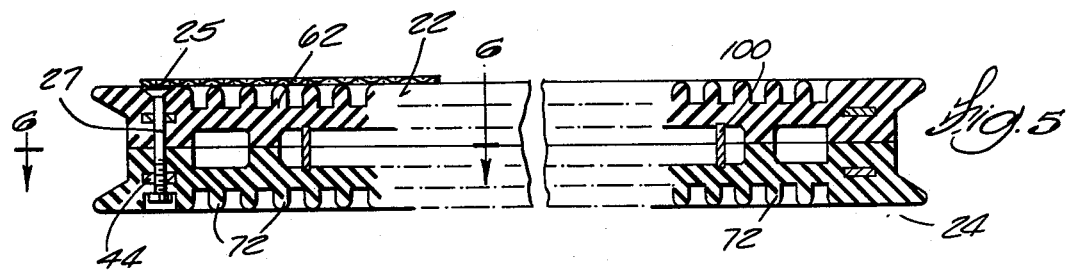
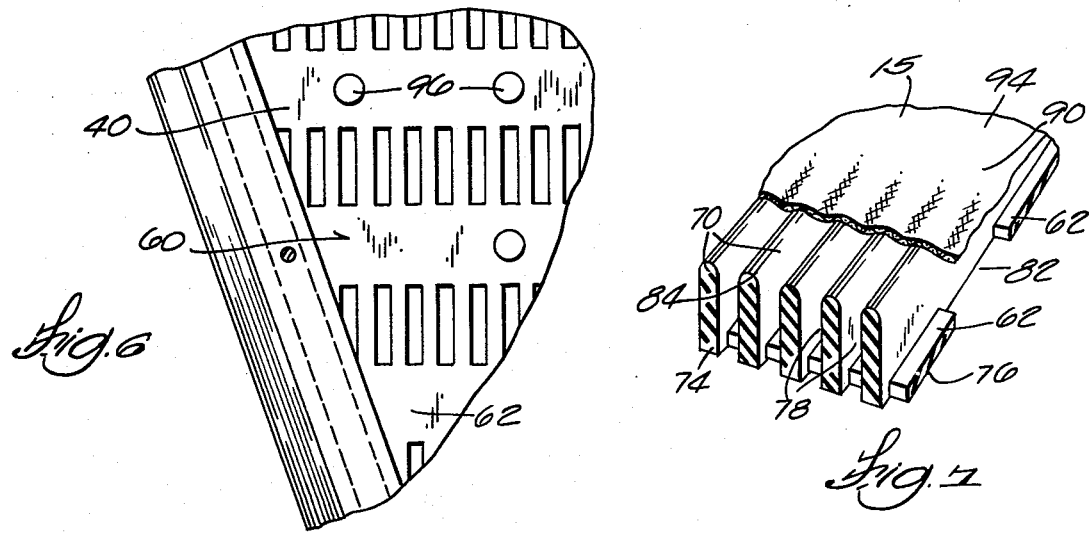
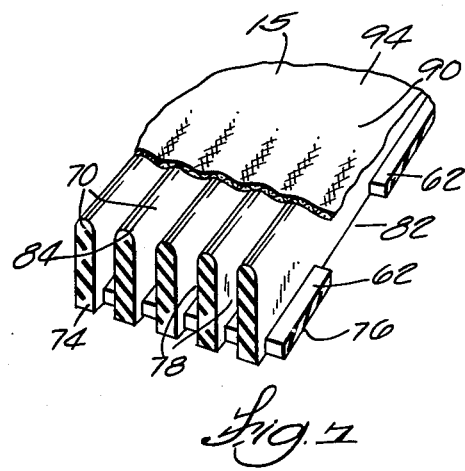

FILTER DISC FOR VACUUM FILTER SYSTEM

BACKGROUND OF INVENTION

The invention relates to vacuum filter discs used to support filter bags in slurry separation of iron ore from water. In filter systems of this type, a plurality of filter discs in the general shape of circular ring sectors are arranged around a rotational axis to form a circular disc. Each sector is provided with its own filter media in the form of a fabric bag which encloses the sector. In use, the disc is rotated through the slurry and the discs communicate with a vacuum manifold. The vacuum withdraws water through the filter and a paste or cake builds up on the surface of the filter bag and is subsequently blown off onto a discharge conveyor.

Some prior art filter sectors have been constructed of spaced steel plates secured together, with the plates being perforated to enable communication of the vacuum manifold with the interior of the filter bag. The perforated iron or steel sectors were subject to corrosion. Other prior art filter sectors are formed from plastic with closed bottom radial grooves which delivered the liquid to the manifold. The plastic sectors do not effectively withstand the mechanical forces to which the sector is subjected to during use and their life is limited. The hard surfaces of the plastic and steel sectors did not provide sufficiently large open area beneath the bag surface for efficient fluid separation and the hard surfaces of these sectors resulted in quick wear of the filter bags.

SUMMARY OF INVENTION

The elastomeric filter sectors of the invention are light weight, strong and economical to manufacture. The elastomeric filter sectors provide a relatively abrasion resistant support surface for the filter bag media, eliminate corrosion and increase the life of the filter bag, thus reducing down time and increasing production.

The filter sectors are molded from rubber or other elastomers, with each sector composed of two half sections which are bolted together. Each half section has a thick peripheral wall which forms a strengthening structure, and defines a liquid transmittal zone within the peripheral wall. A grid of strenghthening bands extend at right angles to a central rib, spans the zone and are connected to the outer peripheral wall. The bands support a superimposed grid of relatively thin ribs which are connected to and intersect at right angles with the bands. The ribs extend above the bands and provide a contact surface with the filter bag. The ribs are rounded to provide a line contact with the bag and thus increase the surface area of the filter bag to which the vacuum is directly applied.

The pattern of overlapping grids of reinforcing bands and ribs creates short slots between the bands which are open to the vacuum cavity between the sector halves. The channels between the ribs and above the bands afford communication of the vacuum with the bag portions located over the bands. The pattern of ribs and bands increases the surface area of the filter bag to which the vacuum is applied two to three times that of the perforated steel sectors of the prior art, which results in increased thickness of the cake build-up and better moisture reduction in the cake to increase efficiency and production of the vacuum disc-slurry filter systems.

Further objects, advantages and features of the invention will become apparent from the disclosure hereof.

DESCRIPTION OF DRAWINGS

FIG. 1 is a fragmentary perspective view of a vacuum disc filter system employing the filter discs of the invention.

FIG. 2 is a plan view of a filter disc sector in accordance with the invention.

FIG. 3 is a sectional view along line 3—3 of FIG. 2.

FIG. 4 is a sectional view along line 4—4 of FIG. 3.

FIG. 5 is a sectional view along line 5—5 of FIG. 3.

FIG. 6 is a view taken along line 6—6 of FIG. 5.

FIG. 7 is a fragmentary perspective view of the filter disc sector shown in FIGS. 2 through 6.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a vacuum filter disc assembly 10 which includes a disc 12 made up of a plurality of filter elements 14 in the shape of circular sectors. The discs 12 are rotated by a gear drive assembly 16 and are connected to a vacuum manifold 18 which communicates with the interior cavity 13 of the individual disc sectors 14 to apply a vacuum to a filter bag 15 carried by each sector 14. The disc 12 is rotated through a slurry tank 20 which might contain iron ore slurry. As a vacuum is drawn, the slurry adheres to the sectors 14 and builds up a cake which is subsequently air blasted from the disc onto an outfeed conveyor (not shown). As thus far described, the apparatus is conventional. The invention relates to the construction of disc sectors 14.

Each of the disc sectors 14 are formed from two half sections 22, 24 (FIGS. 3, 4 and 5). The half sections 22 and 24 are secured together by bolts 25 which extend through registrable apertures 27 in each half section. When assembled, the half sections 22 and 24 together form the disc sector 14 with an interior cavity 13 between the halves 22 and 24 for withdrawing moisture from the filter bag 15 which surrounds the assembled half sections 22 and 24.

Each half section 22, 24 is formed from a molded elastomer with integral steel reinforcing strips. The periphery of each half section is defined by a relatively thick peripheral wall 32 which includes the two generally radially extending side walls 34, 36 and an end wall 38. The walls 34, 36 and 38 surround and define a liquid transmittal zone 40. The members 34, 36 and 38 are provided with integral steel reinforcing members 44 (FIG. 4). Members 34 and 36 terminate in a mouth half section 48 which is also provided with steel reinforcing members 50. The mouth half sections 48 for each half section 22 and 24 together form a throat 52 which is connected to the vacuum manifold 18.

Each half section 22, 24 is provided with a grid 60 of a plurality of spaced reinforcing bands 62 which extend between the side walls 34 and 36 and intersect a central rib 64 (FIG. 2) which extends generally radially with respect to the axis of rotation of the filter sector.

The relatively wide bands 62 support a grid 70 of relatively thin integrally molded ribs 72 which extend generally at right angles to the bands 62 and parallel with the central rib 64. As best shown in FIG. 7, the ribs 70 extend above the bands 62. The bottoms 74 of the ribs 70 are flush with the bottom 76 of the bands. The portions of the ribs above the bands form channels 78 which extend the length of the half sections. The channels afford communication with the interior cavity 13 through the slots 82 between the bands. The ribs 70 provide a supporting surface for the filter media or bag 15. As shown in FIG. 7, the tops 84 of the ribs are rounded to provide a line contact with the filter bag 15. The line contact of the rib tops 84 increases the total area of the filter bag to which vacuum is applied. The channels 78 and slots 82 afford direct vacuum communication for the bag portions such as 90 directly over the slot 82, and the portions of the filter bag such as 94 located over the rib afford communication with the slots indirectly along the channels 78 and then into the slots 82. Thus the network of superimposed rib and reinforcing band grids maximize the area of the filter media which is subjected to the vacuum, which results in increased cake build-up from the slurry as compared with prior art filter sectors and thus is more efficient in the separation of the solids from the liquid in the slurry.

The rounded rib tops 84 also minimize the abrasion on the filter bags 15 to enhance the life of the filter bags. Moreover, the use of molded rubber reduces the abrasion and wear on both the filter disc sectors and the filter bags as compared with prior art sectors. To support the ribs and bands and prevent the ribs from caving in when vacuum is applied, the bottoms 76 of the bands 40 of each sector are provided with spaced bosses or buttons 96. The buttons 96 on one half section align with and abut the buttons 96 on the other half section when the half sections are assembled.

Fluid flow to the mouth 52 can be enhanced by stainless steel fins 100 located in the cavity 13 and extending generally radially toward the mouth 52. The fins 100 extend between and are positioned by the buttons 96.

What I claim is:

1. In a vacuum filter system having a rotatable filter disc, said disc being constructed of a plurality of individual filter assemblies, the improvement wherein said filter assemblies comprise two half sections, each of said half sections comprising a reinforcing framework having a central rib extending generally radially with respect to the axis of rotation of said assembly, a relatively heavy reinforcing peripheral structure forming the margin of each half section and defining a liquid transmittal zone, a first grid of reinforcing bands extending generally at right angles with respect to said central rib and connecting said central rib to said peripheral structure, a second grid of spaced ribs superimposed on said grid of reinforcing bands and extending transversely of said bands, said ribs extending throughout said liquid transmittal zone within said peripheral frame, said ribs being interconnected with said bands and extending above said bands to provide a supporting face for filter media, said bands and said ribs forming a plurality of liquid transmittal slots between adjacent ribs and adjacent bands and fluid flow channels between the ribs and above the bands, a filter media arranged over said supporting face and supported on said face and said ribs supporting the filter media above said slots in said channels, said slots affording vacuum communication with said filter media surface portions directly opposite said slots and filter media portions above said channels to cause fluid flow upon the application of vacuum from the media surface directly into said slots from the media surface opposite said slots and flow from the media surface opposite said channels into said channels and from said channels into said slots, and means for fastening said half sections together to seal the peripheral framework about the fluid transmittal zones.

2. The improvement of claim 1 wherein said ribs have a rounded exterior surface to make a line contact with the filter media.

3. The improvement of claim 1 wherein said half sections are molded from an elastomer.

4. The improvement of claim 1 including radial fins located between said half section to divert fluid flow toward the axis of rotation of said filter assemblies.

* * * * *